US012737575B2

(12) United States Patent
Harvey et al.

(10) Patent No.: US 12,737,575 B2
(45) **Date of Patent: *Sep. 15, 2026**

(54) MULTI-FREQUENCY RFID READER FOR CATTLE

(71) Applicant: FORT SUPPLY IP, LLC, Kaysville, UT (US)

(72) Inventors: Nephi Harvey, Kaysville, UT (US); Malcolm Harvey, Hyde Park, UT (US)

(73) Assignee: FORT SUPPLY IP, LLC, Kaysville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,172

(22) Filed: Jun. 5, 2024

(65) Prior Publication Data

US 2024/0403582 A1 Dec. 5, 2024

Related U.S. Application Data

(63) Continuation of application No. 17/131,690, filed on Dec. 22, 2020, now Pat. No. 12,008,430.

(60) Provisional application No. 62/953,265, filed on Dec. 24, 2019.

(51) Int. Cl.
*G06K 7/10* (2006.01)

(52) U.S. Cl.
CPC ................................ *G06K 7/10475* (2013.01)

(58) Field of Classification Search
CPC ....................... G06K 7/10475; G06K 19/0724
See application file for complete search history.

(56) References Cited

U.S. PATENT DOCUMENTS

| | | | |
|---|---|---|---|
| 7,456,743 | B2 | 11/2008 | Malacarne et al. |
| 7,528,725 | B2 | 5/2009 | Stewart |
| 2007/0262849 | A1 | 11/2007 | Ismail |
| 2009/0309706 | A1 | 12/2009 | Mukherjee et al. |
| 2017/0017817 | A1 | 1/2017 | Chau |
| 2018/0007863 | A1 | 1/2018 | Bailey et al. |
| 2019/0385037 | A1 | 12/2019 | Robadey et al. |
| 2020/0160009 | A1 | 5/2020 | Vatn |

(Continued)

OTHER PUBLICATIONS

Understanding Passive RFID (Radio Frequency Identification) Technology RFID World, 2 pages.

(Continued)

*Primary Examiner* — Tuyen K Vo

(57) ABSTRACT

Some embodiments disclosed in this document include methods and systems for multi frequency RF readers for cattle identification and tracking. Some embodiments include a controller; a first RFID transponder operating in a low frequency range; a first transceiver in communication with the first RFID transponder and in communication with the controller, wherein the first transceiver communicates first cattle data to the controller in a first format; a second RFID transponder operating in an ultra-high frequency range; a second transceiver in communication with the second RFID transponder and in communication with the controller, wherein the second transceiver communicates second cattle data to the controller in a second format, the second format being different than the first format; and a database in communication with the controller.

12 Claims, 3 Drawing Sheets

(56) References Cited

U.S. PATENT DOCUMENTS

| | | | | |
|---|---|---|---|---|
| 2021/0076644 | A1 | 3/2021 | Harvey et al. | |
| 2022/0292272 | A1* | 9/2022 | Knight | A01K 11/006 |

OTHER PUBLICATIONS

IXYS Integrated Circuit Division, R00A, 7 pages.
Non-Final Office Action in U.S. Appl. No. 17/131,690 dated on Oct. 6, 2021, 12 pages.
Final Office Action in U.S. Appl. No. 17/131,690 dated on Feb. 24, 2022, 13 pages.
Notice of Allowance in U.S. Appl. No. 17/131,690 dated on Jun. 10, 2022, 10 pages.

* cited by examiner

MULTI-FREQUENCY RFID READER FOR CATTLE

BACKGROUND

Livestock tend to be a group of subject assets respectively manifesting social behavior, whether individually, as a social subgroup, or as a social group. For example, an animal has certain known individual or social behaviors manifesting health or illness. It can be beneficial to monitor these behaviors for improvement of efficiency and security. Livestock production is biosensitive, resource-intensive and, therefore, a margin-sensitive enterprise. Therefore, livestock producers seek to maximize production by quickly identifying individual behavior which may be deemed abnormal for a particular individual or social group. Abnormal behavior may be indicative of disease or theft which, if not mitigated by timely treatment, poses a risk of impaired well-being, or even death, both to the affected individual and to the group. Early identification of abnormal behavior may lead to timely intervention, preserving the well-being and security of individuals and the group, and increasing a producer's efficiency, competitive advantage, and profitability.

Livestock, such as cattle, are typically bred and raised in relatively open environments, where natural forces, predators, disease, injury, and theft can impair robust, optimal production and, without early intervention, may inflict significant losses. In some embodiments, livestock stewards monitor the well-being of livestock in a social group by periodic direct visual observation. However, a typical social group may have hundreds of members dispersed over a relatively large geographic region like a pasture, open range or smaller confined areas such as stock pens in feedlots, making accurate observations of individual social group members difficult, at best. Also, constituent members of a social group may become distressed and flee at the advance of, and proximity to, social group stewards (pen riders) and other human handlers. Thus, it may be difficult to ascertain the presence, the identity, and the physical state of every social group member. In many circumstances, livestock separated from the social group, for example, by wandering, injury, early onset of disease, or theft, may not be noticed in time for recovery, treatment, or processing.

For some infectious diseases or other conditions, such delays may result in extensive loss of life or substantial reductions in both the well-being of the social group and the profitability of the livestock producer. Recently, it has become desirable to trace the lineage, location, and condition of individual social group members, from birth to slaughter, with the objectives of identifying animals exposed to certain conditions and diseases, of determining the source of exposure, of improving the genetic traits, and thus profitability, of selected breeds, and of facilitating secure food production. Present systems and methods may not provide timely information about a social group and its constituent members in a manner consistent with efficient, traceable livestock production.

SUMMARY

Some embodiments include a method that includes receiving first cattle data from a first transceiver in a first format and second cattle data from a second transceiver in a second format. The second cattle data may be converted from the second format to a first format; and an action based on the first cattle data or the second cattle data may be performed.

In some embodiments, the method further comprises receiving first cattle data from a first transceiver in the first format. In some embodiments, the first cattle data is received at the first transceiver from a first RIFD transponder operating at a low frequency. In some embodiments, the low frequency may include 134.2 kHz or 124.2 kHz or other frequencies.

In some embodiments, the first format comprises a single base 10 number of the format xxxyyyyyyyyyyyy, where xxx is the country/manufacturer code and yyyyyyyyyyyy is the unique non-repeating ID of the cattle tag. In some embodiments, the second format may include a format consistent with ISO/IEC 18000-6C EPC to be decoded into the xxxyyyyyyyyyyyy format.

In some embodiments, the second cattle data is received at the second transceiver from a second RFID transponder operating at a ultra-high frequency. In some embodiments, the high frequency may include a frequency in the 902 MHz-928 MHz range, or about 400 MHz, or 2.4 GHz, or other frequencies.

Some embodiments include a system that may include: a controller; a first RFID transponder operating in the low frequency range; a first transceiver in communication with the first RFID transponder and the controller, wherein the first transceiver communicates first cattle data to the controller in a first format; a second RFID transponder operating in the ultra-high frequency range; a second transceiver in communication with the second RFID transponder and the controller, wherein the second transceiver communicates second cattle data to the controller in a second format; and a database in communication with the controller.

In some embodiments, the low frequency range comprises 134.2 kHz. In some embodiments, the ultra-high frequency range comprises 902 MHz-928 MHz or 860-920 MHz or a frequency band centered on 916 MHz.

In some embodiments, the controller converts cattle data from the second format to the first format.

In some embodiments, the first format comprises a single base 10 number of the format xxxyyyyyyyyyyyy, where xxx is the country/manufacturer code and yyyyyyyyyyyy is the unique non-repeating ID of the cattle tag. In some embodiments, the second format comprises a format consistent with ISO/IEC 18000-6C EPC.

In some embodiments, the database comprises either or both a cloud database or a local database.

Some embodiments include a method comprising: receiving first cattle data from a first transceiver in the first format; receiving second cattle data from a second transceiver in a second format; looking up the identity of an animal based on either or both the first cattle data or the second cattle data; and outputting a single output that includes the identity of the animal and may include additional data indicating which transceiver received the data.

In some embodiments, the first cattle data is received at the first transceiver from a first RIFD transponder operating at a low frequency. In some embodiments, the low frequency comprises 134.2 kHz. In some embodiments, the first format comprises a single base 10 number of the format xxxyyyyyyyyyyyy, where xxx is the country/manufacturer code and yyyyyyyyyyyy is the unique non-repeating ID of the cattle tag.

In some embodiments, the second format comprises a format consistent with ISO/IEC 18000-6C EPC. In some embodiments, the second cattle data is received at the second transceiver from a second RFID transponder operating at a ultra-high frequency. In some embodiments, the high frequency comprises a frequency in the 902 MHz-928 MHz range.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to process first cattle data received from a first cattle transceiver in a first format and second cattle data received from a second cattle transceiver in a second format. In some embodiments, the processing may include translating the second cattle data from the second format to the first format. In some embodiments, the processing may include performing an action based on first cattle data or the second cattle data.

Figure 1:
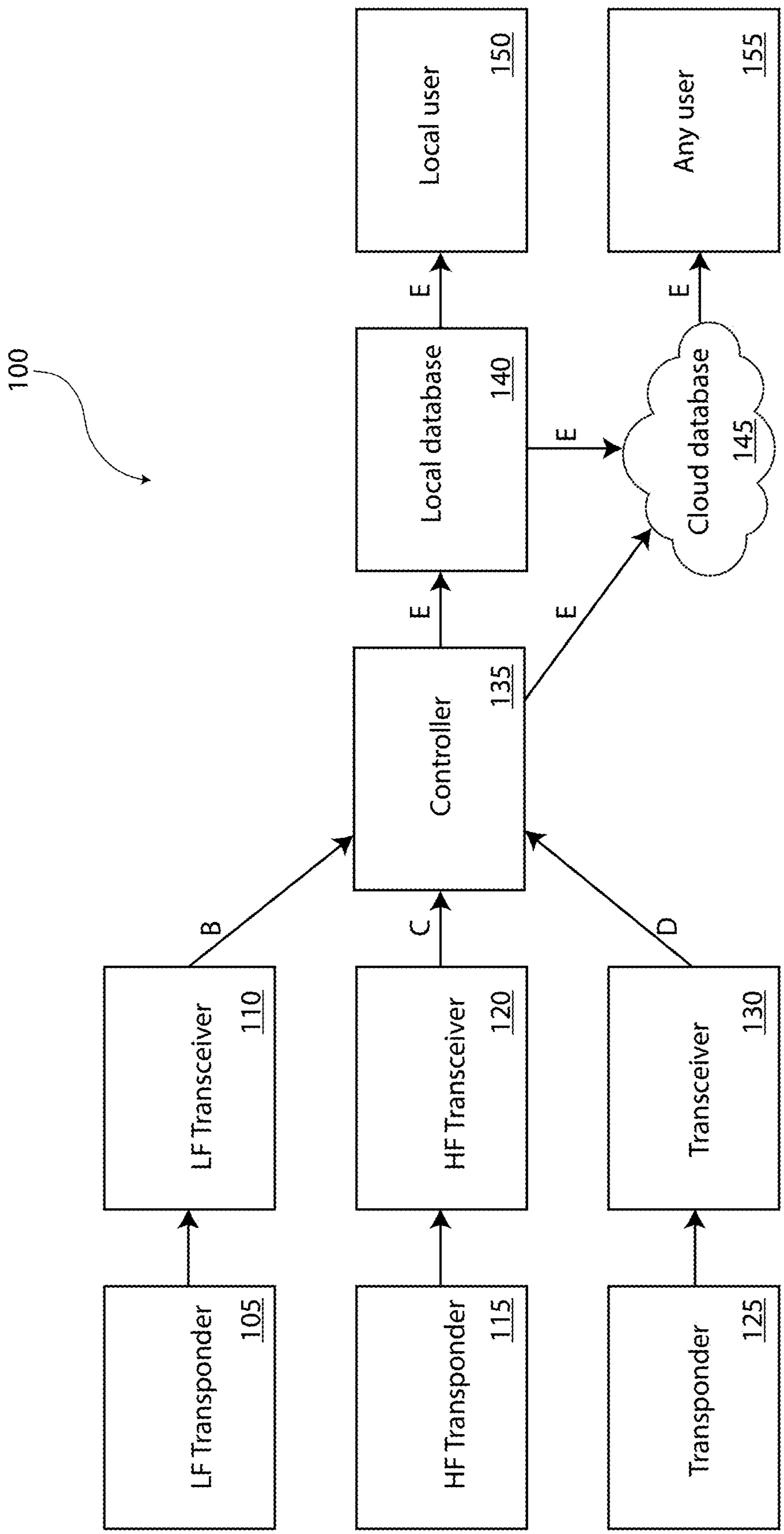
FIG. 1 is block diagram of an example multi-frequency RFID tag reader system for cattle management according to some embodiments.

FIG. 1 is block diagram of an example multi-frequency RFID tag reader system 100 for cattle management according to some embodiments. The RFID tag reader system 100 may include an low frequency (LF) transponder 105 and an LF transceiver 110. The RFID tag reader system 100 may include an high frequency (HF) transponder 115 and an HF transceiver 120. The high frequency transponder 115 may, for example, operate in the HF and UHF bands.

The RFID tag reader system 100 may include a third frequency transponder 125 and a third transceiver 130. This third frequency transponder 125 may, for example, operate in any frequency band such as, for example, the LF, HF, or UHF bands. In some embodiments, the third frequency transponder 125 and/or the third transceiver 130 may or may not be included.

In some embodiments, the LF transponder 105 may operate at 134.2 kHz. In some embodiments, the LF transponder 105 may operate under the ISO 11784/1996 standard and/or the ISO 11785/1996 standard. Either or both of these standards may proscribe communication between the LF transponder 105 and the LF transceiver 110 and/or communication between the LF transceiver 110 and the controller 135. In some embodiments, data from the LF transponder 105 may encode data in In some embodiments, the HF transponder 115 may operate at in the 902 MHZ-928 MHz range. In some embodiments, the HF transponder 115 may operate under the ISO/IEC 18000-6° C. operating standard.

The transceivers (e.g., LF transceiver 110, HF transceiver 120, and/or third transceiver 130) may communicate with a controller 135 via communication channel B, C, or D which may include wired or wireless communication channels. In some embodiments, when the LF transceiver 110 communicates with the controller 135, it may do so using a LF protocol. In some embodiments, when the HF transceiver 120 communicates with the controller 135, it may do so using an HF protocol, which is different than the LF protocol. In some embodiments, when the third transceiver 130 communicates with the controller 135, it may do so using a third protocol, which may or may not be different than either or both the LF protocol or the HF protocol.

In some embodiments, communication channel B between the LF transceiver 110 and the controller 135 may include any type of communication channel such as, for example, serial, Ethernet, wireless (Wi-Fi, Bluetooth, Zigbee, etc.), cellular, 5G, modem, etc. In some embodiments, the LF data may be formatted using an LF format such as, for example, a single base 10 number of the format xxxyyyyyyyyyyyy, where xxx is the country/manufacturer code and yyyyyyyyyyyy is the unique non-repeating ID of the cattle tag. This code may be followed by a <CR>, <LF>, <,> or other such delimiter as necessary by the back end database.

In some embodiments, communication channel C between the HF transceiver 120 and the controller may include any type of communication channel such as, for example, serial, Ethernet, wireless (Wi-Fi, Bluetooth, Zigbee, etc.), cellular, 5G, modem, etc. In some embodiments, the HF data may be encoded in using an HF protocol that is different than the LF protocol. The HF protocol may include the format specified by ISO/IEC 18000-6C EPC. For example, this may look like one of the following:

A0 17 01 8A 93 40 00 01 82 0E 44 98 F5 78 FA FB 02 00 74 20 00 00 00 52 34 or

A0 13 01 8A 3E 30 00 00 01 82 OF 11 6E 2D 24 98 8C 03 00 56 75 or

A0 13 01 8A CC 30 00 28 40 00 31 29 28 73 97 FF FF FF FF 31 A5.

In some embodiments, communication channel D between the third Transceiver 130 and the controller 135 may include any type of communication channel such as, for example, serial, Ethernet, wireless (Wi-Fi, Bluetooth, Zigbee, etc.), cellular, 5G, modem, etc. The data from the third transponder 130 may be formatted with a third format.

In some embodiments, the communication channel E between the controller 135 and the local database 140 and/or the cloud database 145 may include any communication channel such as, for example, serial, Ethernet, wireless (Wi-Fi, Bluetooth, Zigbee, etc.), cellular, 5G, modem, etc. In some embodiments, the communication channel E may communicate the data using TCP/IP protocol.

The controller 135 may include any or all the components of computational system 300.

In some embodiments, the controller 135 may convert data in the HF format or the third format into the LF format. For example, the controller 135 may convert data from the HF transceiver 120 in a format specified by ISO/IEC 18000-6C EPC into an LF format such as, for example, a single base 10 number of the format xxxyyyyyyyyyyyy.

In some embodiments, the LF transponder and the LF transceiver may be coupled together in a single device. In some embodiments, the HF transponder and the HF transceiver may be coupled together in a single device. In some embodiments, the third transponder and the third transceiver may be coupled together in a single device.

Figure 2:
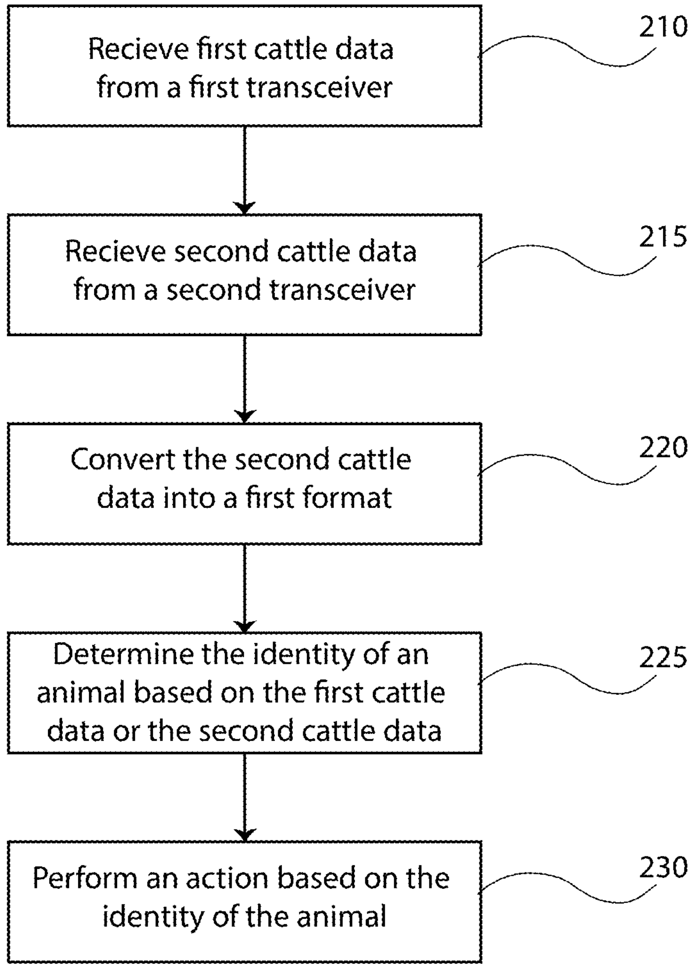
FIG. 2 is a flowchart of a process according to some embodiments.

FIG. 2 is an example flowchart of a process 200 according to some embodiments. The various block may occur in any order, may be removed, or replaced. Additional blocks may be included. In some embodiments, the process 200 may be executed by the controller 135 shown in FIG. 1.

At block 210 first cattle data may be retrieved from a first transceiver in a first format. For example, the first cattle data may be received from an LF transceiver using an LF protocol in an LF format such as, for example, a single base 10 number of the format xxxyyyyyyyyyyyy.

At block 215 second cattle data may be retrieved from a second transceiver in a second format. For example, the second cattle data may be received from an HF transceiver using an HF protocol in an HF format such as, for example, in a format specified by ISO/IEC 18000-6C EPC. Blocks 210 and 215 may occur in any order or at the same time.

At block 220 the second cattle data may be converted into the first format. For example, the second cattle data may be converted into converted second cattle data having the first format such as, for example, a single base 10 number of the format xxxyyyyyyyyyyyy.

At block 225 the identify of an animal can be determined based on either or both the first cattle data or the second cattle data. For example, an identifier can be parsed from either the first cattle data or the converted second cattle data. This identifier, for example, may be yyyyyyyyyyyy characters in the 15 number of the format xxxyyyyyyyyyyyy.

At block 230 an action may be taken based on the identity of the animal. For example, the identity of the animal may be used to lookup information about the animal in either or both the cloud database or the local database. An action may be performed based on the information retrieved from the either or both the cloud database or the local database. An action may include, for example, one or more of the following: opening a gate, closing a gate, adding an entry in either or both the cloud database or the local database, purging milk associated with the animal from milk supply, weighing the animal, identifying a symptom of a disease, adding data to either the cloud database or the local database base, comparing first cattle data with the second cattle data to determine the identity of an animal, etc.

In some embodiments, process 200 can be repeated each time either first cattle data is received from the first transceiver at block 210 or second cattle data is received from the second transceiver at block 215.

In some embodiments, process 200 can may also include blocks for receiving cattle data from a third transceiver in a third format.

In some embodiments, process 200 may receive first cattle data in a first format at block 210 and receive second cattle data in a second format at block 215 from the same animal. Rather than convert the second cattle data at block 220, process 200 may look up the identity of the animal in either or both the Cloud Database or the Local Database using either or both the first cattle data or the second cattle data. At block 230, the process 200 may output a single identifier such as, for example, in the first format that identifies the animal. In some embodiments, process 200 may receive two (or more) inputs from two or more transceivers and output a single animal identifier based on the either or both the inputs.

Figure 3:
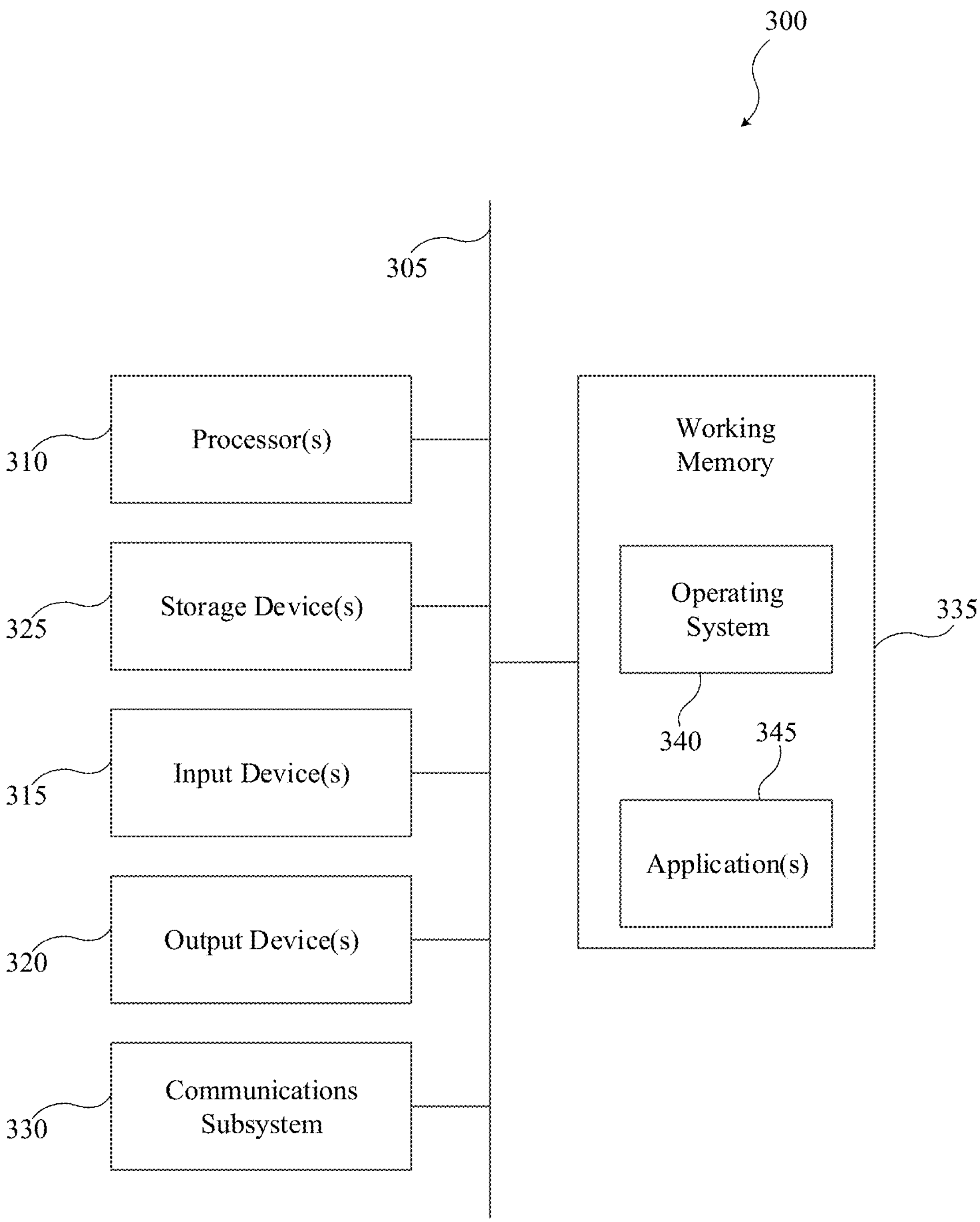
FIG. 3 is a block diagram computational system for performing functionality to facilitate implementation of embodiments described herein.

The computational system 300, shown in FIG. 3 can be used to perform any of the embodiments of the invention. The computational system 300 may perform process 200. As another example, computational system 300 can be used perform any calculation, identification and/or determination described here. Computational system 300 includes hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computational system 300 may further include (and/or be in communication with) one or more storage devices 325, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 300 might also include a communications subsystem 330, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 330 may permit data to be exchanged with a network (such as the network described below, to name one example), and/or any other devices described herein. In many embodiments, the computational system 300 will further include a working memory 335, which can include a RAM or ROM device, as described above.

The computational system 300 also can include software elements, shown as being currently located within the working memory 335, including an operating system 340 and/or other code, such as one or more application programs 345, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 325 described above.

In some cases, the storage medium might be incorporated within the computational system 300 or in communication with the computational system 300. In other embodiments, the storage medium might be separate from a computational system 300 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 300 and/or might take the form of source and/or installable code, which, upon compilation and/or installation on the computational system 300 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:

receiving at a controller first cattle data from a first transceiver operating in a frequency of about 134.2 kHz;

receiving at the controller second cattle data from a second transceiver operating in a frequency between about 902 MHz and about 928 MHz;

determining an identity of an animal at the controller based on the first cattle data and the second cattle data; and outputting from the controller a single output that includes the identity of the animal;

wherein the first format comprises a single base 10 number of the format xxxyyyyyyyyyyyy, where xxx is the country/manufacturer code and yyyyyyyyyyyy is the unique non-repeating ID of the cattle tag.

2. The method according to claim 1, wherein the first cattle data is received in a first format.

3. The method according to claim 2, wherein the second cattle data is received in a in a second format, wherein the second format is different than the first format.

4. The method according to claim 3, wherein the second format comprises a format consistent with ISO/IEC 18000-6C EPC.

5. A system comprising:

a controller;

a first RFID transponder operating in a low frequency range;

a first transceiver in communication with the first RFID transponder and in communication with the controller, wherein the first transceiver communicates first cattle data to the controller in a first format;

a second RFID transponder operating in an ultra-high frequency range;

a second transceiver in communication with the second RFID transponder and in communication with the controller, wherein the second transceiver communicates second cattle data to the controller in a second format, the second format being different than the first format; and wherein the controller determines the identity of an animal based on the first cattle data and the second cattle data, and wherein the controller outputs the identity of the animal;

wherein the first format comprises a single base 10 number of the format xxxyyyyyyyyyyyy, where xxx is the country/manufacturer code and yyyyyyyyyyyy is the unique non-repeating ID of the cattle tag.

6. The system according to claim 5, wherein the low frequency range comprises a frequency of about 134.2 kHz.

7. The system according to claim 5, wherein the ultra-high frequency range comprises frequencies from about 902 MHz to about 928 MHz.

8. The system according to claim 5, wherein the controller converts cattle data from the second format to the first format.

9. The system according to claim 5, wherein the second format comprises a format consistent with ISO/IEC 18000-6C EPC.

10. The system according to claim 5, wherein the controller is coupled with a local database.

11. A method comprising:

receiving first cattle data from a first transceiver that operates in low frequency of 134.2 kHz or 124.2 kHz;

receiving second cattle data from a second transceiver that operates in high frequency between 902 MHz-928 MHz;

looking up the identity of an animal based on the first cattle data and the second cattle data; and outputting a single output that includes the identity of the animal;

wherein the first format comprises a single base 10 number of the format xxxyyyyyyyyyyyy, where xxx is the country/manufacturer code and yyyyyyyyyyyy is the unique non-repeating ID of the cattle tag.

12. The method according to claim 11, wherein the first cattle data is received at the first transceiver from a first RIFD transponder.

* * * * *